| United States Patent [19] | [11] | 4,140,668 |
|---|---|---|
| Sumi et al. | [45] | Feb. 20, 1979 |

[54] WATER SOLUBLE OR WATER DISPERSIBLE HOT-MELT ADHESIVE COMPOSITIONS BASED ON POLYVINYL ALCOHOL WITH RESIDUAL ACETATE GROUPS AND PROCESS FOR PRODUCING THE SAME

[75] Inventors: Masao Sumi; Juni-Ichi Suenaga, both of Uji, Japan

[73] Assignee: Unitika Ltd., Hyogo, Japan

[21] Appl. No.: 851,319

[22] Filed: Nov. 14, 1978

Related U.S. Application Data

[63] Continuation of Ser. No. 653,869, Jan. 30, 1976, abandoned.

[30] Foreign Application Priority Data

| Jan. 31, 1975 | [JP] | Japan | 50-13647 |
| Jan. 31, 1975 | [JP] | Japan | 50-13648 |
| Feb. 21, 1975 | [JP] | Japan | 50-22137 |
| Feb. 21, 1975 | [JP] | Japan | 50-22138 |

[51] Int. Cl.$^2$ .......................... C08K 5/05; C08K 5/06; C08K 5/15; C08K 5/35
[52] U.S. Cl. .......................... 260/33.2 R; 260/29.6 B; 260/30.2; 260/30.4 R; 260/33.4 R; 428/511; 526/7; 526/10; 526/11; 526/212; 526/330
[58] Field of Search ............. 526/9; 260/30.2, 30.4 R, 260/33.4 R, 33.2 R

[56] References Cited

U.S. PATENT DOCUMENTS

| 3,068,061 | 12/1962 | Johnson et al. | 18/54 |
| 3,156,667 | 11/1964 | Martins | 260/45.7 |
| 3,444,125 | 5/1969 | Schimelpfenig et al. | 260/33.4 |
| 3,597,264 | 8/1971 | Sirota | 117/122 S |
| 3,720,633 | 3/1973 | Nickerson | 260/17.4 ST |

Primary Examiner—Stanford M. Levin
Attorney, Agent, or Firm—Sughrue, Rothwell, Mion, Zinn and Macpeak

[57] ABSTRACT

Adhesive compositions which comprise polyvinyl alcohol having about a 30 to about a 60 mol% residual acetate group content which are produced by dissolving polyvinyl acetate having a degree of polymerization ($\bar{p}$) of about 60 to about 200 in methanol, the amount of the methanol ranging from about the stoichiometric amount necessary for obtaining polyvinyl alcohol having the desired degree of hydrolysis to about 2 times as much as the above-defined stoichiometric amount and carrying out alkaline hydrolysis and a process for preparing the same. If desired, a suitable amount of a plasticizer and/or an ethylene-vinyl acetate copolymer can be added thereto.

Water soluble or water dispersible hot-melt adhesive compositions containing such polyvinyl alcohol as a main ingredient are suitable for paper making such as bookbinding or paper bag making, etc., in which products are obtained that can be reclaimed after use.

24 Claims, No Drawings

WATER SOLUBLE OR WATER DISPERSIBLE HOT-MELT ADHESIVE COMPOSITIONS BASED ON POLYVINYL ALCOHOL WITH RESIDUAL ACETATE GROUPS AND PROCESS FOR PRODUCING THE SAME

RELATION TO OTHER APPLICATIONS

This is a continuation of application Ser. No. 653,869, filed Jan. 30, 1976, now abandoned.

BACKGROUND OF THE INVENTION

1. Field of the Invention

The present invention relates to hot-melt adhesive compositions and to processes for preparing the same.

2. Description of the Prior Art

Recently, hot-melt adhesives have been developed as non-solvent type adhesives which permit high speed processing and which have excellent adhesive properties suitable for mass production. Hot-melt adhesives are mainly used for processing paper goods which can be collected after use and reclaimed. However prior hot-melt adhesives as are commonly used have serious defects from the viewpoint of the economics of collecting and reclaiming the used paper because they do not dissolve or disperse in water, and, therefore, are difficult to reclaim or they deteriorate to lower the commercial value of the reclaimed paper.

As water soluble polymers which melt by heating, vinyl acetate-vinyl pyrrolidone copolymers and water soluble nylons are known. However, they cannot be used for bookbinding or sealing corrugated paper and cartons because they have so high a viscosity that commonly used applicators cannot be used to apply the same. Further, they have insufficient water dispersibility or low adhesive properties. Further, remoistenable hot-melt adhesive compositions containing partially hydrolyzed polyvinyl acetates having a degree of hydrolysis of about 50 to about 85 mol% as a main ingredient, which can be used for envelopes, postage stamps, gum tapes or wall paper, etc., have been described in U.S. Pat. No. 3,597,264. In this patent, polyvinyl alcohol having an acetate group content of about 15 to about 50 mol% (the adhesive ingredient) is produced by acid hydrolysis of an aqueous dispersion of polyvinyl acetate (hereinafter referred to as PVAc). In general, acid hydrolysis has the following defects, as described in "Polyvinyl Alcohol", pages 91 - 96, edited by C. A. Finch, (published by a Wiley-Interscience Publications (1973)): A large amount of acid catalyst and a long period of time are required to obtain a desired degree of hydrolysis because the rate of the hydrolysis reaction is very low as compared with that of alkaline hydrolysis. Further, it causes a deterioration of the quality of the polyvinyl alcohol (hereinafter referred to as PVA) because a large amount of salts are formed by neutralization with alkalis after the reaction because of the use of a large amount of acid catalyst, which salts are retained in PVA. Further, it is necessary to remove a large amount of water by evaporation in order to obtain PVA because the hydrolyzed product formed by the hydrolysis in an aqueous medium dissolves in water. As described above, acid hydrolysis is economically disadvantageous as compared with alkaline hydrolysis. Therefore, acid hydrolysis has not been utilized hitherto for the industrial production of PVA.

Further, the arrangement of residual acetate groups in the PVA molecules obtained by acid hydrolysis is random, as compared with that of PVA obtained by alkaline hydrolysis. Accordingly, the PVA obtained by the former process has a low melting point, a low melt viscosity and high hygroscopicity, and, while suitable for remoistenable adhesives, its adhesive strength is insufficient for use for bookbinding, sealing corrugated paper or cartons, etc.

Particularly, PVA obtained by acid hydrolysis has extremely low adhesive strength at a high temperature and high humidities.

On the other hand, PVA obtained by known alkaline hydrolysis processes is difficult to melt, has a high melting point, a high melt viscosity and poor heat stability and undergoes foaming upon melting. In order to lower the melting point, it is necessary to add a large amount of a plasticizer or plasticizers. However, adhesive strength is deteriorated by the addition of a plasticizer(s), and thus the resultant PVA has comparatively low adhesive strength and cannot even be used as a remoistenable adhesive which does not require high adhesive strength.

SUMMARY OF THE INVENTION

An object of this invention is to eliminate the above described drawbacks of conventional hot-melt adhesive compositions and to provide water soluble or water dispersible hot-melt adhesive compositions which can be used for bookbinding, sealing of corrugated paper or cartons, etc., and a process for producing the same.

Further, it is an object of this invention to provide adhesive compositions having good adhesiveness over a wide range of temperature, e.g., more than 2.5 Kg/5cm width at a low temperature of 8° C. and more than 2 Kg/5cm width at 50° C. and 90% relative humidity.

It is another object of this invention to provide adhesive compositions having a softening point of from about 100° to about 150° C, and which are in the melted state at about 180° C.

Furthermore, it is an object of this invention to provide adhesive compositions having a melt viscosity of about 1,000 cps to about 8,000 cps at about 180° C and which are not evaporated when heated.

Still further, it is an object of this invention to provide adhesive compositions having good heat stability such that they are hardly colored even when allowed to stand in the melted state at about 180° C. for 24 hours.

Moreover, it is an object of this invention to provide adhesive compositions which comprise polyvinyl alcohol having about a 30 to about a 60 mol% residual acetate group content which are produced by dissolving polyvinyl acetate having a degree of polymerization ($\bar{p}$) of about 60 to about 200 in methanol, the amount of the methanol ranging from about the stoichiometric amount necessary to obtain a polyvinyl alcohol having the desired degree of hydrolysis to about 2 times as much as the above-defined stoichiometric amount, and carrying out alkaline hydrolysis, and, if desired, a suitable amount of a plasticizer and/or an ethylene-vinyl acetate copolymer can be added thereto, and a process for preparing the same.

The hot-melt adhesive compositions of the present invention have the advantages that they can be used for bookbinding, for sealing corrugated paper, cartons, etc., they do not block the screens or adhere to a metal wire screen roll in paper manufacturing equipment, nor spot in reclaimed paper goods, and thus they effectively economize paper resources, and the production of such products is industrially economical and easily carried out.

Further, hot-melt adhesive compositions of this invention are advantageous in that they can be used for various purposes where the adhesive compositions whose main component is the earlier mentioned acid hydrolyzed polyvinyl alcohol (U.S. Pat. No. 3,597,264) are not suitable.

The present inventors performed extensive research in order to improve various defects of prior art compositions containing a water soluble hot-melt polymer particularly PVA, and found that PVAc containing lower amounts of terminal aldehyde groups and having good heat stability avoids such defects. Further, they found that the degree of hydrolysis can easily be controlled by dissolving the PVAc mentioned above in absolute methanol at high concentration (about 60 to about 80 weight%) and hydrolyzing the same, because the hydrolysis can be stopped at any desired degree of hydrolysis (about 30 to about 60 mol%), that the amount of sodium acetate produced by alkaline hydrolysis included in the resultant PVA is decreased and the heat fusibility and heat stability are increased because of being able to decrease the amount of alkali catalyst used, that when the amount of residual volatile substances is decreased by melt-drying the caky PVA after hydrolysis foaming of the PVA at melting does not occur, that the heat stability of the PVA in the melted state is remarkably improved by adding a phosphoric acid compound thereto, and that the melting point and melt viscosity of the PVA can be controlled by changing the amount of plasticizer added thereto in relation to the average degree of polymerization of the PVA, and that the water-solubility or water-dispersibility of the adhesive formed therefrom can be controlled by changing the amount of the residual acetate groups in the PVA, and thus reached the present invention.

In the present invention, PVAc having a degree of polymerization of about 60 to about 200 is dissolved in methanol, the amount of which is from about the stoichiometric amount required to obtain polyvinyl alcohol having the desired degree of hydrolysis to about 2 times as much as the above-defined stoichiometric amount (about 40 to about 70 mol%), and is hydrolyzed by one or more alkalis.

The water soluble or water dispersible hot-melt adhesive compositions of this invention are obtained by adding one or more plasticizers in an amount of above about $(0.08\bar{p} - 10)\%$ (above 0%) by weight and below about $(0.08\bar{p} + 25)\%$ by weight based on PVA and/or an ethylene-vinyl acetate copolymer in an amount of 0 to less than 50% by weight based on PVA.

Detailed Description of Preferred Embodiments

In the present invention, it is important to produce PVAc having good heat stability and a low degree of polymerization. The average degree of polymerization of the PVAc required in the present invention is in the range of from about 60 to about 200. The degree of polymerization is obtained by determining the viscosity of a solution of PVAc in acetone in the amount of about 5g/l at 30° C. and solving the following equation:

$$\log \bar{p} = 1.613 \log \frac{[\eta] \times 10^4}{7.94}$$

where $[\eta]$ is intrinsic viscosity.

In order to produce PVAc having such a degree of polymerization, it is preferred to polymerize vinyl acetate (hereinafter referred to as VAc) in alcohol having a chain transfer constant above about $20 \times 10^{-4}$ at the polymerization temperature. Examples of such alcohols include ethyl alcohol, isopropyl alcohol, isobutyl alcohol, sec-butyl alcohol, cyclohexanol, etc. Usually the polymerization is carried out using a mixture of vinyl acetate and an alcohol in a ratio of about 40:60 to 70:30 by weight in the presence of azobisisobutyronitrile in an amount of from about 0.03 to about 0.2% by weight based on the weight of vinyl acetate at a temperature of from about 60° to 70° C. at atmospheric pressure for from about 4 to about 6 hours. When VAc is polymerized in one of these alcohols or in a mixture of these alcohols, PVAc having good heat stability is obtained because less amounts of acetaldehyde are formed by an ester interchange reaction represented by the following scheme and the amount of aldehyde groups introduced into the terminal groups of the polymer decreases:

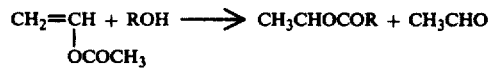

After polymerization, the solution of PVAc is heated under reduced pressure to remove the alcohol(s) (s) used as the polymerization solvent, whereby PVAc is obtained. PVAc available on the market is now produced by the solution polymerization of VAc in methanol (the chain transfer constant thereof at 60° C is from $3 \times 10^{-4}$ to $5 \times 10^{-4}$). In this case, in order to decrease the degree of polymerization to below 200, the VAc concentration should be below 25% by weight. Accordingly, this process has low productivity and is not economical. Further, the resultant PVAc is colored and has low heat stability.

It is well known to use a so-called telomerization reaction which comprises polymerizing by adding a strong transfer agent to produce PVAc having a low degree of polymerization. In this case, however, the resultant PVAc easily colors and has very low heat stability and is easily gelled upon melting with heat, and the PVA resulting therefrom by hydrolysis is further colored.

In the PVAc used in the present invention, it is necessary to have a degree of polymerization of about 60 to about 200.

PVAc having a degree of polymerization below about 60 is not suitable for the adhesive compositions of the present invention because PVA obtained from such PVAc by partially hydrolyzing it has low compatibility with plasticizers, and resultant adhesive compositions have poor adhesive properties at both low and high temperatures, and have low heat stability when they are melted with heat. On the other hand, when the degree of polymerization of the PVAc is above about 200, adhesive compositions containing PVA produced by partially hydrolyzing such PVAc have too high a melting point and too high a melt viscosity, and thus are not easily processed. Considering ease of processing and adhesive properties, it is preferred the average degree of polymerization of the PVAc of this invention be in the range of about 120 to about 160.

The PVA used in the present invention can be obtained by dissolving PVAc having an average degree of polymerization of from about 60 to about 200 in absolute methanol, the amount of the absolute methanol being from about the stoichiometric amount necessary to obtain polyvinyl alcohol having the desired degree of hydrolysis (about 40 to about 70 mol%) to about 2 times as much as the above-defined stoichiometric amount, and hydrolyzing using an alkali catalyst in order to control the residual acetate group content in the PVA. When the amount of methanol is more than 2 times greater than the stoichometric amount, it is difficult to keep the degree of hydrolysis under 70 mol%.

Preferred hydrolysis conditions in the present invention are as follows:

absolute methanol having a water content below about 0.05% by weight is used;

the concentration of PVAc is about 65 to about 87% by weight;

sodium hydroxide, calcium hydroxide or sodium methylate is used as the alkali catalyst in an amount of about 1/1000 to about 7/1000 molar equivalents based on PVAc; and hydrolysis is carried out at about 30° to about 40° C. under atomspheric pressure.

Characteristics of this hydrolysis are that the period of time from the addition of the alkali catalyst to gelation is as short as below about 30 minutes, the degree of hydrolysis is easily controlled because an equilibrium value of the degree of hydrolysis can be obtained within about an hour after gelation, the resultant hydrolyzed product (PVA) can easily be handled and dried because it is in a caky state, and the amount of organic solvent recovered after hydrolysis is small, etc. These characteristics are quite different from prior art alkaline hydrolysis processes wherein methanol was used in an amount of more than 2 times the stoichiometric amount to obtain the desired degree of hydrolysis. Thus, it is understood that the hydrolysis process used in the present invention is easily carried out economically on an industrial scale.

The PVA obtained by the hydrolysis described above, the PVA having a residual acetate group content of about 30 to about 60 mol% and a degree of hydrolysis of about 70 to about 40 mol%, preferably a residual acetate group content of from about 40 to about 50 mol% and a degree of hydrolysis of from about 60 to about 50 mol%, is used as the base polymer for forming the adhesive compositions of the present invention. When PVA having below about a 30 mol% residual acetate group content is used, the resultant adhesive compositions have a high melt viscosity which deteriorates the processability thereof. On the other hand, when PVA having above about a 60 mol% residual acetate group content is used, the water solubility or water dispersibility of the resultant adhesive compositions is lost and the compatibility thereof with plasticizers and the adhesive strength at high temperatures deteriorates. The residual acetate group content in the PVA is calculated from the amount of alkali necessary to produce fully hydrolyzed PVA by rehydrolysis of the partially hydrolyzed PVA. Here, the degree of polymerization of the partially hydrolyzed PVA is the same as that of the PVAc before hydrolysis. This was confirmed from the following experiment. PVAc which was produced by acetylation [in a mixture of pyridine and acetic acid anhydride (2:1) volume] of PVA having a 39.8 mol% residual acetate group content obtained by alkaline hydrolysis of PVAc having a degree of polymerization of 140 according to Example 2 had a degree of polymerization of 141.

It is believed that the resultant PVAc had no branched chains which causes lowering of the degree of polymerization during hydrolysis because it was polymerized in an alcohol having a high chain transfer constant.

Drying of the caky PVA formed by hydrolysis in accordance with the invention should be carried out by heating at about 90° to about 200° C. under reduced pressure of about 200 to about 600 mmHg. In this case, it is possible to inhibit foaming of the adhesives at melting by using a process which comprises introducing the PVA into a vent type extruder (as described in Encyclopedia of Polymer Science and Technology: Vol 8, pages 559 – 563) held at a temperature of above the melting point of the PVA, volatilizing the solvent through vent openings near the middle portion of the extruder to decrease the residual solvent to below about 0.1% by weight, and removing the PVA in the melted state. Vent type extruders having a compression ratio of about 2.5 to about 6 and an L/D ratio of about 20 to about 35 are particularly preferred, although any conventional extruder used for drying polyester chips can be used.

As will be described below, PVA having a degree of polymerization below about 125 can be used by themselves in the adhesives of the present invention. However, in the case that the degree of polymerization of PVA is above about 125, it is necessary to control the melting point, the melt viscosity and the flexibility by adding one or more plasticizers. As the plasticizers used for the above purpose in the present invention, there are polyhydric alcohols such as glycerine, ethylene glycol, propylene glycol, pentamethylene glycol, hexamethylene glycol, polyethylene glycol, pentaerythritol or sorbitol, etc., urea derivatives such as ethylene urea and compounds for plasticizing PVA such as caprolactam, etc. Among these plasticizers, materials which are liquid at room temperature such as glycerine, ethylene glycol and propylene glycol, etc., render the adhesive compositions more tacky and are easily volatilized during melting of the adhesive compositions with heat. On the other hand, materials which are solid at room temperature such as pentaerythritol, sorbitol and ethylene urea, etc., do not render the adhesive compositions more tacky and impart only low flexibility thereto. Accordingly, it is most preferred that a plasticizer which is liquid at room temperature and a plasticizer which is solid at room temperature be used as a mixture. Further, polyethylene glycol having a weight average molecular weight of about 400 to about 1,000 can be used without mixing with a plasticizer of another type as mentioned above.

As the amount of the plasticizer added increases, the melting point and the melt viscosity decrease, and therefore the flexibility and the water solubility of the adhesive compositions improve, while the adhesive strength deteriorates and the adhesive compositions become too tacky. Accordingly, the amount of the plasticizer added should be above about $(0.08\bar{p} - 10)\%$ by weight (above 0%) and below about $(0.08p + 25)\%$ by weight, based on PVA in relation to the degree of polymerization of the PVA. Adhesive compositions composed of such ingredients have a melting point of about 150 to about 180° C, a melt viscosity of about 1,000 to about 8,000 cps (at 180° C) and show a good adhesive property and flexibility not only at room temperature but also at lower and higher temperatures.

By the addition of an ethylene vinyl acetate copolymer (hereinafter referred to as EVA), the tackiness and the adhesive properties of adhesive compositions are improved, but the water solubility thereof deteriorates. Accordingly, EVA should be added in an amount of less than 50% by weight based on the PVA. EVA having a melt index (JIS K6760-1966) of about 150 to about 400 are preferred.

Since the amount of sodium acetate produced in alkaline hydrolysis included in the PVA which is a main ingredient of the adhesive composition of the present invention is less than 0.5% by weight, it does not have a significant influence on the heat decomposition upon melting by heating.

A phosphoric acid compound such as phosphorous acid, phosphoric acid or pyrophosphoric acid, etc., when added in an amount of about 0.1 to about 3% by weight, preferably 0.5 to 1.5% by weight, based on the PVA, further improves the thermal stability of the adhesive compositions such that the adhesive compositions only slightly darken when heated at 180° C.for 24 hours, because the phosphoric acid compound provides an excellent antioxidation effect.

To summarize, water soluble or water dispersible hot-melt adhesive compositions of this invention which are most suitable for bookbinding and sealing of corrugated papers and cartons are preferably obtained as follows (with earlier given condition being used unless otherwise indicated).

(1) The VAc is polymerized in ethanol or isopropyl alcohol (weight ratio of VAc/alcohol is about 40/60 to about 70/30) using azobisisobutyronitrile as a catalyst at about 60° to about 70° C.for about 3 to about 6 hours under atmospheric pressure.

(2) The resultant PVAc having a degree of polymerization of about 120 to about 160 is dissolved in absolute methanol (water content of the methanol is below 0.1 wt%. In this case, PVAc must be dissolved in the absolute methanol which is in an amount of from about the stoichiometric amount necessary to obtain PVA having a most preferred degree of hydrolysis (about 50 to about 60 mol%) to 2 times as much as said stoichiometric amount.

(3) Alkaline hydrolysis is carried out by adding an alkali catalyst, e.g., NaOH, in an amount of about 1/1000 to about 5/1000 molar equivalents based on PVAc at about 30° to about 40° C. under atmospheric pressure. Thus it is possible to obtain the PVA having about a 40 to about a 50 mol% residual acetate group content.

(4) The most preferred adhesive compositions of this invention are obtained by melt-mixing the resultant PVA with a polyethylene glycol having a weight average molecular weight of about 400 to about 600 as a plasticizer, an ethylene-vinyl acetate copolymer having a melt index of about 400 and a phosphoric acid compound, e.g., phosphorous acid, in an amount of about 5 to about 35 weight %, about 15 to about 35 weight % and about 1 weight % based on PVA, respectively. The thus obtained adhesive compositions easily dissolve and disperse in water at about 20° to about 30° C. They have a softening point of from about 120° to about 140° C.and are in the melted state at about 160° C.and have a melt viscosity of from about 1,000 to about 6,000 cps at 180° C.

In the present invention, the mixture of PVA and the plasticizer described above, EVA and a phosphoric acid compound may be produced by adding each ingredient to dry PVA and mixing them in the melted state. However, it is more industrially economical to carry out a process which comprises adding the ingredients described above to PVA in a caky state after hydrolysis, introducing the mixture into a vent type extruder held at a temperature at above the melting point of the PVA, volatilizing residual organic solvent contained in partially hydrolyzed PVA, taking out the resultant adhesive composition in the melted state and chipping the thus obtained adhesive after cooling. In this case, a vent type extruder similar to that used for drying the solution of PVA can be used.

In the present invention, other additives such as heat stabilizing agents, pigments and bulking agents may be added to the adhesive compositions unless they injure water solubility, water dispersibility or the heat-melting property of the adhesive composition. When the adhesive compositions of the present invention are used for bookbinding or sealing corrugated paper or cartons, no problems are caused by the adhesive compositions in reclaiming used paper goods, and the adhesive compositions used do not remain as fragments in reclaimed paper goods. Thus, spots caused by residual adhesive composition, which are normally observed in reclaimed paper goods produced from waste paper in which prior art hot-melt adhesive composition have been used, are not generated in the reclaimed paper goods.

In the adhesive compositions of the present invention, the adhesive property, particularly, at high temperatures and high humidities, is superior to that of adhesive compositions containing a partial hydrolysis product formed by acid hydrolysis. Further, the surface of the adhesive compositions of the present invention is not as tacky as such prior art adhesive compositions, evaporation in the melted state does not excessively occur and the melt viscosity at 180° C.is about 1,000 to about 8,000 cps. In addition, the adhesive compositions of the invention have good heat stability and good flexibility and do not undergo foaming at melting, and, thus, have excellent properties as hot-melt adhesives.

The water soluble or water dispersible adhesive compositions of the present invention can be used not only for bookbinding and sealing corrugated paper or cartons but also as remoistenable adhesives for postage stamps or envelopes, pasting filaments, as a heat sealing agent for water soluble PVA films and for heat-sensitive adhesives. Further, the adhesive compositions of the present invention can easily be applied using applicators as have been used for applying conventional prior art hot-melt adhesives.

In the following, the present invention is illustrated in greater detail with reference to several examples of most preferred embodiments of the present invention.

Method of Measurement

1. PVA as the base polymer (1) Melting point

A PVA powder was enclosed in a glass capillary which was then sealed by melting. The temperature was elevated at a rate of 1° C/minute in a conventional melting point apparatus. The melting point was shown as the temperature at which the PVA powder began to melt.

(2) Water solubility 0.2g of a PVA powder was put in a test tube and 10 ml of pure water added thereto. The mixture was stirred at 20° C. After stirring for 24 hours, the amount of solid residue was determined.

(3) Melt viscosity

About 10g of a PVA powder was put in a sample container of a Brookfield Viscometer (Model B-8H-HH) and melted by heating on an oil bath at 180° C and the melt viscosity was determined using an HH-2 rotor.

2. Adhesive composition (1) Softening point (Ring and ball method according to JIS-K-2531)

A ring having a 19.8 mm inner diameter and a 6.4 mm height was filled to the top thereof with a sample of the adhesive composition. The ring was horizontally supported in an oil bath. A 3.5g steel ball having a 9.35 mm diameter was put on the central part of the sample and the temperature of the bath elevated at a rate of 2° C/minute to soften the sample. The temperature at which the sample came into contact with the bottom plate of a ring supporting table placed 27 mm below the bottom of the ring due to the weight of the ball was measured.

(2) Melt viscosity

About 50 g of a sample of the adhesive composition was heated at 180° C. in an oil bath to melt the same. Melt viscosity was then measured with a Brookfield Viscometer Model B-8H using a No. 7 rotor.

(3) Water solubility or water dispersibility

A fragment of a sample of the adhesive composition 25 mm × 20 mm × 1 mm weighing about 0.5g was dipped in 100ml of water at 30° C. Water solubility was shown by a weight of the residual solid material after 60 minutes as % by weight.

(4) Flexibility

Flexibility was evaluated by observing the state of a molded product 1 mm thick, which was bent at room temperature, to determine whether cracks were present or not.

(5) Adhesive property

A sample of the adhesive composition was melted at 180° C. and applied to a sheet of corrugated paper 3 mm (thickness) × 50 mm (width) × 100 mm (length) in an amount of 0.1 g/5cm length. The sheet was superposed on another sheet of corrugated paper having the same size, and the resultant laminate was pressed at 1 Kg/cm² for 5 seconds. After removing the pressure, the sheets were separated by drawing at a rate of 100 mm/min. at 20° C. by means of a Tensilon meter (UT Type M-1), whereby peeling strength was measured. In addition, adhesive strength was measured by changing the temperature and the humidity.

The water soluble or water dispersible hot-melt adhesive compositions in accordance with the present invention can be coated onto material to be coated at about 170 to about 190° C. in a manner similar to conventional hot-melt adhesive compositions for use in bookbinding.

All "parts" in the following examples are by weight unless otherwise indicated. All processings were at atmospheric pressure unless otherwise indicated.

Example 1 and Control 1

- Production of PVAc

This example refers to the PVAc used for producing the PVA used as a base polymer for the adhesive compositions of the present invention.

50 parts of ethanol in No. 1, 50 parts of isopropanol in No. 2, 50 parts of n-butanol in No. 3, 50 parts of isobutanol in No. 4, 50 parts of sec-butanol in No. 5, 50 parts of cyclohexanol in No. 6 and 50 parts of methanol in No. 7 were each used as a polymerization solvent. These solvents were mixed with 50 parts of VAc in each case. After 0.1 part of azobisisobutyronitrile was added to the resultant mixtures, the mixtures were polymerized at 60° C.for 5 hours. In No. 8, 0.6 part of azobisiobutyronitrile was added to a mixture of 30 parts of VAc and 70 parts of methanol. In No. 9, 1.0 part of azobisisobutyronitrile was added to a mixture of 50 parts of VAc, 50 parts of methanol and 6 parts of acetaldehyde. In No. 10, 1.5 parts of azobisisobutyronitrile were added to a mixture of 60 parts of VAc, 40 parts of methanol and 0.9 parts of carbon tetrachloride. Mixtures No. 8 to No. 10 were polymerized at 60° C. for 5 hours.

The results obtained are shown in Table 1.

It can be seen that PVAc having good stability and a degree of polymerization of about 60 to about 200 which does not color upon melting with heat can be obtained when alcohols having a chain transfer constant at 60° C. of above about 20 ($C_s \times 10^4$) are used as the solvent.

Table 1

| Run No. | Polymerization solvent and additive | Chain transfer constant at 60° C* ($C_s \times 10^4$) | Polymerization yield (% by weight) | Degree of Polymerization (p) | Color of fused PVAc | |
|---|---|---|---|---|---|---|
| 1 | Ethanol | 25 | 93.3 | 140 | Colorless; transparent | Example |
| 2 | Isopropanol | 44.6 | 92.0 | 80 | " | " |
| 3 | n-Butanol | 20.4 | 90.5 | 155 | " | " |
| 4 | Isobutanol | 21.7 | 90.8 | 156 | " | " |
| 5 | sec-Butanol | 31.7 | 94.1 | 148 | " | " |
| 6 | Cyclohexanol | 127 | 89.2 | 62 | " | " |
| 7 | Methanol | 4 – 6 | 87.4 | 610 | " | Control |
| 8 | Vinyl acetate/methanol = 30/70 | | 56.3 | 210 | Yellow; transparent | " |
| 9 | Vinyl acetate/methanol/acetaldehyde = 50/50/6 | | 75.2 | 180 | Yellowish-brown; transparent | Example |
| 10 | Vinyl acetate/methanol/carbon tetrachloride = 60/40/0.9 | | 77.1 | 138 | Reddish-brown | " |

*Vinyl Polymerization, Part I., Kinetics and Mechanisms of Polymerization Series, Vol. 1, 241 (1967), edited by George E. Ham.

Example 2 and Control 2

- Production of PVA

This example shows an alkaline hydrolysis process for obtaining PVA's having a high residual acetate group content which are used for producing the adhesive compositions of the present invention.

PVAc having a degree of polymerization of 140 prepared by polymerizing VAc using ethanol (No. 1 of Example 1) as the solvent was subjected to alkaline hydrolysis to produce hydrolyzed products having a 60 mol% degree of hydrolysis (PVA having a 40 mol% residual acetate group content). In this case, the alkaline hydrolysis was carried out by dissolving PVAc in absolute methanol so that the ratio of methanol to the stoichiometric amount of PVAc was 1.78 in No. 1 and 3.22 in No. 2 in Table 2, adding NaOH in an amount of 3.5 millimolar equivalents based on PVAc, stirring at 40° C. for 5 minutes and thereafter allowing the system to stand for 5 to 90 minutes.

Similarly, PVAc was dissolved in absolute methanol so that the ratio of methanol to the stoichiometric amount necessary to obtain a product having a 60 mol% hydrolysis value was 1.51 in No. 3 and 2.22 in No. 4 in Table 2. After adding NaOH in an amount of 0.7 millimole equivalents based on PVAc, the solutions were stirred at 40° C. for 5 minutes and allowed to stand for 5 to 90 minutes.

The relationship between the degree of hydrolysis and the gelation time after NaOH addition and the period of time after the gelation are shown in Table 2.

It can be understood from Table 2 that the reaction stopped after a desired hydrolysis value was obtained in No. 1 and No. 3 wherein the ratio of methanol to the stoichiometric amount necessary to obtain the desired hydrolysis value was 2 times or less, while control of the degree of hydrolysis was difficult in No. 2 and No. 4 wherein methanol in the amount of above 2 times the stoichiometric amount was used, because the hydrolysis value of the product at a point 10 minutes after gelation exceeded 70 mol%, though a desired degree of hydrolysis was obtained at 5 minutes after gelation. In alkaline hydrolysis, the period of time necessary to hydrolyze is within 1 hour, which is very short as compared to acid hydrolysis. Accordingly, alkaline hydrolysis is industrially advantageous.

the extruder was kept at 100° C. and 250° C. before and after the vent opening, respectively. The melted product extruded at the end of the extruder was cooled to below 50° C. and chipped.

The resultant PVA had a volatiles content below 0.1% by weight, a melting point of 155° C. and a melt viscosity at 180° C. of 3,900 cps and was easily melted without foaming.

On the contrary, roughly crushed PVA cake dried in a vacuum dryer at 90° C. at $10^{-1}$ mm Hg for 10 hours underwent a fair amount of foaming at the beginning of melting.

Further, the hydrolyzed product of No. 2 in Example 2 which was composed of 26.8% by weight of PVA (degree of polymerization: 140, residual acetate group content: 20 mol%), and the balance an organic solvent, could not be crushed because it was in jelly form and it could not be dried by means of the vent type extruder because it easily adhered thereto.

Example 4 and Control 4

- Production of adhesive composition

This example shows a comparison between a prior art hot-melt adhesive (comprising an ethylene-vinyl acetate copolymer as a main ingredient) and a water soluble or water dispersible hot-melt adhesive composition of the present invention.

The ingredients shown in Table 3 were mixed by melting to produce a homogeneous mixture. (1) was an adhesive composition of the present invention wherein PVA having a low degree of polymerization (155) and Table 2

| Run No. | PVAc (parts) | MeOH (parts) | Ratio of MeOH to stoichiometric amount necessary to obtain a 60 mol% degree of hydrolysis (times) | NaOH (millimole eq.) | Time before gelation (min.) | Degree of hydrolysis (mol%) and period of time after gelation | | | | |
|---|---|---|---|---|---|---|---|---|---|---|
| | | | | | | 5 minutes | 15 minutes | 60 minutes | 90 minutes | |
| 1 | 71.5 | 28.5 | 1.78 | 3.5 | 13 | — | — | 60.5 | 60.2 | Example |
| 2 | 58 | 42 | 3.22 | 3.5 | 16 | 60.3 | 74.0 | — | — | Control |
| 3 | 75 | 25 | 1.51 | 7.0 | 10 | — | — | 60.4 | 60.0 | Example |
| 4 | 67 | 33 | 2.22 | 7.0 | 12 | 59.7 | 72.5 | — | — | Control |

Example 3 and Control 3

- Production of PVA

This example shows a process for drying PVA having a high residual acetate group content used for producing the adhesive compositions of the present invention.

A cake of the hydrolyzed product obtained by hydrolysis in No. 1 of Example 2 has a composition consisting of 40.7% by weight of PVA (degree of polymerization: 140, residual acetate group content: 39.8 mol%), the balance organic solvent composed of methanol and methyl acetate (which is a by-product of hydrolysis). This PVA cake was crushed to obtain particles having a 2 mm to 5 mm diameter. The crushed PVA cake was introduced into a vent type extruder equipped with a vent type single screw made of stainless steel which had a 65 mm diameter, a 10 mm groove depth in the charging part and a 2.5 mm groove depth in the weighing part, i.e., the extrusion weight controlling part, a 3.52 compression ratio and an L/D ratio = 28. The PVA cake was extruded by means of the screw at 80 r.p.m. while exhausting the solvent, that is, the mixture of methanol and methyl acetate, under a reduced pressure of 60 mm Hg from a vent opening which was positioned at 2/5 of the effective screw length. The temperature of a high residual acetate group content (44 mol%) was used, and (2) was a prior art hot-melt adhesive composition wherein a known ethylene-vinyl acetate copolymer resin was used. The properties of these adhesive compositions are shown in Table 3.

It can be understood from Table 3 that the adhesive composition of the present invention has a more excellent adhesive property than the prior art hot-melt adhesive composition at high temperatures. Further, the water solubility of the adhesive composition of the present invention is superior to that of the prior art adhesive composition (i.e., the former composition is completely water soluble while the latter is completely water insoluble), which is an important characteristic of the present invention.

Table 3

| | Composition and property | Example (1) (parts) | Control (2) (parts) |
|---|---|---|---|
| Composition | PVA (degree of polymerization: 155, residual acetate group content: 44 mol%) | 100 | — |
| | Glycerine | 15 | — |
| | Pentaerythritol | 15 | — |
| | Ethylene-vinyl acetate copolymer (vinyl acetate content: 28 weight%, melt index: 150) | 25 | 30 |

Table 3-continued

| Composition and property | | Example (1) (parts) | Control (2) (parts) |
|---|---|---|---|
| | Modified rosin (softening point: 80° C., acid value: 10) | — | 45 |
| | Paraffin wax (softening point: 60° C) | — | 25 |
| | Antioxidant (2,6-di-tert-butyl-p-cresol) | — | 1 |
| | Phosphorous acid | 1 | — |
| Property | Softening point (° C) | 140 | 95 |
| | Melt viscosity (cps) at 180° C. | 5,000 | 3,000 |
| | Adhesive strength (kg/5cm width) 20° C. | 4.2 | 4.2 |
| | 40° C. | 3.9 | 2.4 |
| | 60° C. | 3.9 | 0.5 |
| | Heat stability | Slightly darkened fluid | Slightly darkened fluid |
| | Water solubility (insoluble material; (weight%)) 20° C. | 0 | 100 |
| | 40° C. | 0 | 100 |

Example 5 and Control 5
Production of Adhesive Composition

This example shows comparisons of compositions obtained by the homogeneous mixing of the ingredients shown in Table 4 with (1): PVA produced by the alkaline hydrolysis of the present invention at 180° C.; (2) available PVA produced by an alkaline hydrolysis process (GL02 produced by Nippon Synthetic Chemical Industry Co.); (3): PVA produced by a homogeneous acid hydrolysis process; (4): PVA produced by a heterogeneos acid hydrolysis process which comprises hydrolyzing the same as an aqueous dispersion.

The properties of the PVA used and the ingredients and properties of the adhesive compositions are shown in Table 4.

Adhesive composition (2) wherein the available PVA having the lowest degree of polymerization was used is not suitable for a hot-melt adhesive because of having a high melting point, a high melt viscosity and poor processability. Adhesive compositions (3) and (4) wherein acid hydrolysed PVA was used were suitable only for remoistenable adhesives because they were easily melted and had a low melt viscosity and high hygroscopicity. However, they could not be used as hot-melt adhesives for bookbinding or sealing because they had low adhesive strength and, particularly, a very bad adhesive strength at high temperatures and high humidities. On the contrary the adhesive composition (1) of the present invention was suitable for use as a water-soluble hot-melt adhesive composition for bookbinding, sealing corrugated paper and cartons because it had high adhesive strength and was not so tacky.

Table 4

| | Composition and property | Example (1) | Control (2) | Control (3) | Control (4) |
|---|---|---|---|---|---|
| PVA | Degree of polymerization | 140 | 270 | 140 | 140 |
| | Degree of Hydrolysis(%) | 62 | 87 | 64 | 65 |
| | Sodium acetate (wt%) | 0.38 | 1.8 | containing $Na_2SO_4$ | containing $Na_2SO_4$ |
| | Process of hydrolysis | Alkaline hydrolysis. | Alkaline hydrolysis. Available on the market. | Homogeneous acid hydrolysis in solution of methanol. $H_2SO_4$ catalyst | Heterogeneous acid hydrolysis in aqueous dispersion. $H_2SO_4$ catalyst |
| Ingredient | PVA | 100 parts | 100 parts | 100 parts | 100 parts |
| | Polyethylene glycol (molecular weight: 400) | 35 parts | 35 parts | 35 parts | 35 parts |
| | Ethylene-vinyl acetate copolymer (vinyl acetate content: 28 weight%, melt index: 400) | 25 parts | 25 parts | 25 parts | 25 parts |
| | Phosphoric acid | 1 part | 1 part | — | — |
| Property | Softening point (° C) | 144 | 170 | 93 | 101 |
| | Melt viscosity (cps) at 180° C. | 6,000 | 76,000 | 2,500 | 2,000 |
| Adhesive strength (kg/5cm width) | 8° C. RH 65% | 4.3 | High melt viscosity. Poor processing property | 2.8 | 2.9 |
| | 90% | 4.3 | | 2.4 | 2.6 |
| | 20° C. 65% | 4.2 | | 2.5 | 2.7 |
| | 90% | 3.5 | | 1.5 | 1.6 |
| | 40° C. 65% | 4.0 | | 2.1 | 2.4 |
| | 90% | 2.8 | | 1.1 | 1.2 |
| | 50° C. 65% | 3.9 | | 1.8 | 1.9 |
| | 90% | 2.3 | | 0.3 | 0.5 |
| | Heat stability | Slightly darkened fluid | Black gummy fluid | Slightly darkened fluid | Slightly darkened fluid |
| | Water solubility (insoluble material (wt%)) | 0 | 0 | 0 | 0 |
| | Tackiness of surface | None | None | Tacky. High hygroscopicity. | Tacky. High hygroscopocity. |

Note: RH = relative humidity.

Example 6 and Control 6
- Production of Adhesive Composition

This example shows the effect of a liquid plasticizer, a solid plasticizer or an ethylene-vinyl acetate copolymer.

The ingredients shown in Table 5 were homogeneously mixed by melting at 180° C to produce adhesive compositions and the properties thereof compared.

However, composition (9) wherein a small amount of phosphorous acid was additionally added as an antioxidant had more excellent heat stability.

Table 5

| | Composition and property | Control (1) | Control (2) |
|---|---|---|---|
| Ingredient: | PVA (degree of polymerization: 160, residual acetate group content: 43 mol %) | 100 parts | 100 parts |
| | Ethylene-vinyl acetate copolymer (vinyl acetate content: 28 weight %, melt index: 400) | — | 25 parts |
| | Glycerin (liquid) | — | — |
| | Polyethylene glycol (molecular weight: 600, semi-solid) | — | — |
| | Sorbitol (solid) | — | — |
| | Phosphorous acid | — | — |
| Property | Softening point (° C) | 169 | 165 |
| | Melt viscosity (cps) at 180° C. | 35,000 | 32,000 |
| | Flexibility | Destroyed | Destroyed |
| | Tackiness of surface | None | None |
| | Volatilization at melting | None | None |
| | Adhesive strength 20° C. | Poor processing property. | |
| | 40° C. | Impossible to apply. | |
| | Water solubility at 20° C.(wt%) | 23 | 13 |
| | Heat stability | Moderate darkening. Highly viscous fluid. | " |

| | Example | | | | | | |
|---|---|---|---|---|---|---|---|
| | (3) | (4) | (5) | (6) | (7) | (8) | (9) |
| | 100 parts | 100 parts | 100 parts | 100 parts | 100 parts | 100 parts | 100 parts |
| | | | | | 25 parts | 25 parts | 25 parts |
| | — | 35 parts | — | 20 parts | 35 parts | — | — |
| | — | — | 35 parts | — | — | 35 parts | 35 parts |
| | 35 parts | — | — | 15 parts | — | — | — |
| | — | — | — | — | — | — | — |
| | 135 | 132 | 133 | 128 | 130 | 125 | 125 |
| | 8,000 | 4,000 | 5,000 | 4,000 | 3,500 | 3,500 | 3,500 |
| | Rather flexible. | Flexible | " | " | " | " | " |
| | Hardly sticky. | Tacky | Hardly tacky | Hardly tacky | None | None | None |
| | None | High | Hardly observed. | Hardly observed | HIgh | None | None |
| | | 3.2 | 3.8 | 3.8 | 4.0 | 4.2 | 4.2 |
| | | 2.9 | 3.6 | 3.6 | 3.9 | 4.0 | 4.1 |
| | 0 | 0 | 0 | 0 | 0 | 0 | 0 |
| | Moderately darkened fluid. | " | " | " | " | " | Slightly darkened fluid. |

Composition (1) wherein PVA having a degree of polymerization of 160 and a 43 mol% residual acetate group content was used by itself and Composition (2) wherein ethylene-vinyl acetate copolymer was mixed with the same PVA as described above could not be used as adhesives because of their high melt viscosity and low flexibility. Composition (3) wherein sorbitol was used as a solid plasticizer had rather inferior flexibility. Composition (4) wherein glycerine was used as a liquid plasticizer had a sticky surface and underwent high volatilization upon melting. Composition (5) wherein semi-solid polyethylene glycol having a molecular weight of 600 was used gave a fairly good adhesive composition because it did not form a sticky surface and hardly underwent volatilization at melting. Composition (6) wherein a liquid plasticizer (glycerine) and a solid plasticizer (sorbitol) were admixed had nearly the same properties as Composition (5) wherein polyethylene glycol was used. Composition (7) wherein glycerine and ethylene-vinyl acetate copolymer were added formed a surface having faint tackiness but volatilization of the glycerine at melting was substantial. But Compositions (8) and (9) wherein the ethylene-vinyl acetate copolymer and polyethylene glycol were added had excellent properties as an adhesive composition.

Example 7 and Control 7

- Production of Adhesive Composition

This example shows the influence of the residual acetate group content in the PVA used for the hot-melt adhesive compositions of the present invention upon properties.

Table 6 shows the properties of adhesive compositions prepared by mixing 100 parts of PVA having a degree of polymerization of 120 and a prescribed residual acetate group content, 30 parts of polyethylene glycol having a molecular weight of 600 and 25 parts of an ethylene-vinyl acetate copolymer having a 28 weight% vinyl acetate content and a melt index of 400, upon melting at 180° C.

Compositions wherein PVA having below about a 20 mol% residual acetate group content was used were unsuitable as adhesive compositions because they had a high melt viscosity and poor processability. Further, compositions wherein PVA having above about a 65 mol% residual acetate group content was used were also unsuitable as adhesive compositions, because they had low water solubility or low ater dispersability. In view of the melt viscosity and the adhesive property, PVA having about a 40 to about a 50 mol% residual acetate group content is preferred.

Table 6

|  | Control |  | Example |  |  | Control |  |
|---|---|---|---|---|---|---|---|
| Residual acetate group content in PVA (mol %) | 20 | 31 | 43 | 51 | 60 | 64 | 75 |
| Softening point (° C) | 160 | 148 | 140 | 130 | 125 | 120 | 117 |
| Melt index (cps) at 180° C. | 20,000 | 8,000 | 5,000 | 3,000 | 2,500 | 2,000 | 1,000 |
| Adhe3sive strength (kg/scm width) 20° C. | Poor processability | 3.7 | 3.8 | 4.0 | 3.6 | 3.6 | 3.5 |
| 40° C. |  | 5.6 | 3.8 | 3.8 | 3.1 | 2.8 | 2.2 |
| Water solubility at 20° C.(weight % of insoluble materials) | 0 | 0 | 0 | 0 | 0 | 25 | 70 |

Example 8 and Control 8

- Production of Adhesive Composition

This example shows the influence of the amount of plasticizers added to PVA upon the properties of the PVA. The properties of the adhesive compositions produced by mixing the ingredients shown in Table 7 by melting at 180° C.are shown in Table 7. The amount of the plasticizer(s) had some relation to the degree of polymerization of the PVA. Namely, in case (1) wherein the degree of polymerization of the PVA was low (120), the composition could be used without any plasticizer. However, in case (5) wherein PVA having a degree of polymerization of 165 was used, the composition was unsuitable unless one or more plasticizers were added because it had a high melt viscosity and poor processability. On the other hand, when the plasticizers were added to PVA in an amount of above about (0.08 $\bar{P}_{Ac}$ + 25)% by weight as in cases (4) and (8), the compositions became unsuitable because of a low adhesive strength.

Example 9 and Control 9

- Production of Adhesive Composition

This example shows the influence of the degree of polymerization of the PVA on the adhesive composition.

Adhesive compositions were prepared by the homogeneous mixing of ingredients as shown in Table 8 by melting at 180° C. The properties of each adhesive composition were determined and the results are shown in Table 8. Adhesive composition (1) wherein PVA having a degree of polymerization of 50 was used had a low adhesive strength and could not be used as an adhesive for bookbinding. On the other hand, when the degree of polymerization was above about 200, as in the case of adhesive composition (6), the composition was unsuitable as a hot-melt adhesive because it had too high a melt viscosity and poor processability.

Table 7

|  | Composition and property | Example |  | Control |  | Example |  |  | Control |
|---|---|---|---|---|---|---|---|---|---|
|  |  | 1 | 2 | 3 | 4 | 5 | 6 | 7 | 8 |
| Ingredient | PVA (degree of polymerization: 120, residual acetate group content: 58 mol%) | 100 parts | 100 parts | 100 parts | 100 parts | — | — | — | — |
|  | PVA (degree of polymerization: 165, residual acetate group content: 45 mol %) | — | — | — | — | 100 parts | 100 parts | 100 parts | 100 parts |
|  | Polyethylene glycol (molecular weight: 400) | — | 5 parts | 25 parts | 36 parts | — | 5 parts | 30 parts | 40 parts |
|  | Ethylene-vinyl acetate copolymer (vinyl acetate content: 28 weight%, melt index: 400) | — | 15 parts | 15 parts | 25 parts | — | 15 parts | 15 parts | 15 parts |
|  | Pyrophosphoric acid | 1 | 1 | 1 | 1 | 1 | 1 | 1 | 1 |
| Property | Softening point (° C) | 145 | 130 | 120 | 105 | 163 | 144 | 130 | 95 |
|  | Melt viscosity (cps) at 180° C. | 8,000 | 5,500 | 2,500 | 1,000 | 15,000 | 7,800 | 3,000 | 1,200 |
|  | Adhesive strength (kg/5cm width) | 4.1 | 4.5 | 4.1 | 1.9 | — | 4.5 | 4.0 | 2.0 |

Table 8

|  | Composition and property | Control | Example |  |  |  | Control |
|---|---|---|---|---|---|---|---|
|  |  | 1 | 2 | 3 | 4 | 5 | 6 |
| Ingredient | PVA (degree of polymerization: 50, residual acetate group content: 58 mol%) | 100 parts |  |  |  |  |  |
|  | PVA (degree of polymerization: 65, residual acetate group content: 55 mol%) |  | 100 parts |  |  |  |  |
|  | PVA (degree of polymerization: 105, residual acetate group content: 48 mol%) |  |  | 100 parts |  |  |  |
|  | PVA (degree of polymerization: 170, residual acetate group content: 45 mol%) |  |  |  | 100 parts |  |  |
|  | PVA (degree of polymerization: 200, residual acetate group content: 45 mol%) |  |  |  |  | 100 parts |  |
|  | PVA (degree of polymerization: 220, residual acetate group content: 45 mol%) |  |  |  |  |  | 100 parts |
|  | Propylene glycol | 5 parts | 10 parts | 20 parts | 30 parts | 30 parts | 40 parts |
|  | Ethylene-vinyl acetate copolymer |  |  | 20 parts | 35 parts | 25 parts | 25 parts |

Table 8-continued

| | Composition and property | Control 1 | Example 2 | Example 3 | Example 4 | Example 5 | Control 6 |
|---|---|---|---|---|---|---|---|
| | vinyl acetate content: 28 weight %, melt index: 400) | | | | | | |
| Property | Phosphorous acid | 1 part | 1 part | 1 part | 1 part | 1 part | 1 part |
| | Softening point (° C) | 90 | 115 | 120 | 150 | 160 | 168 |
| | Melt viscosity (cps) at 180° C. | 800 | 1,300 | 2,000 | 5,300 | 8,000 | 23,000 |
| | Adhesive strength (kg/5cm width) | | | | | | |
| | 20° C. | 2.1 | 2.5 | 3.8 | 4.3 | 4.5 | Poor Processability |
| | 40° C. | 0.3 | 1.8 | 3.5 | 4.3 | 4.5 | Poor Processability |

Example 10 and Control 10

- Production of Adhesive Composition

This example shows an adhesive composition of the present invention.

A caky hydrolyzed product which was obtained after 90 minutes from gelation in the same manner as Run No. 3 in Example 2 comprised 52% by weight of PVA (degree of polymerization: 140) having a 40 mol% residual acetate group content and 48% by weight of an organic solvent composed of methanol and methyl acetate (ratio of methanol to methyl acetate: about 1:3.8). To 100 parts of this caky hydrolyzed product, 13 parts (25% by weight based on dried PVA) of an ethylene-vinyl acetate copolymer (vinyl acetate content: 28% by weight, melt index: 150), 15.6 parts (30% by weight based on dried PVA) of polyethylene glycol having a molecular weight of 800 and 0.52 parts by weight (1% by weight based on dried PVA) phosphoric acid were added. Then, the mixture was stirred at 80° C. at $10^{-1}$ mmHg to remove the organic solvent by evaporation. As the evaporation of the organic solvent decreased, the mixture melted when heated up to 170° C. After adhesion of two sheets of corrugated paper using the melted mixture described above, adhesive strength was determined using the "adhesive property" test earlier described. The friction pull strength at 5 cm width was 4.3 kg at 20° C. and 4.1 kg at 40° C. When a strip (25×20×1mm) produced by cooling the melted mixture was dipped in water at room temperature, it was finely dispersed in the water after 10 minutes.

While the invention has been described in detail and with reference to specific embodiments thereof, it will be apparent to one skilled in the art that various changes and modifications can be made therein without departing from the spirit and scope thereof.

What is claimed is:

1. Water soluble or water dispersible hot-melt adhesive compositions which consist essentially of:
   (a) polyvinyl alcohol having about a 30 to about a 60 mol% residual acetate group content which is prepared by dissolving polyvinyl acetate having an average degree of polymerization ($\bar{p}$) of about 60 to about 200 in absolute methanol, the amount of the absolute methanol being from about the stoichiometric amount necessary to obtain polyvinyl alcohol having a degree of hydrolysis of about a 40 to about a 70 mol% to about 2 times as much as the above-defined stoichiometric amount, and carrying out alkaline hydrolysis;
   (b) one or more plasticizers in an amount of above about $(0.08\bar{p} - 10)\%$ by weight (but above 0% by weight) and below about $(0.08\bar{p} + 25)\%$ by weight based on the polyvinyl alcohol; and (c) an ethylene-vinyl acetate copolymer in an amount of 0 to about 50% by weight based on the polyvinyl alcohol.

2. Adhesive compositions as set forth in claim 1 wherein the polyvinyl acetate is produced by polymerizing vinyl acetate in one or more alcohols having a chain transfer constant above about $20 \times 10^{-4}$ at the polymerization temperature.

3. Adhesive compositions as set forth in claim 2 wherein the one or more alcohols include ethanol.

4. Adhesive compositions as set forth in claim 2 wherein the one or more alcohols include isopropanol.

5. Adhesive compositions as set forth in claim 1 wherein the one or more plasticizers include polyethylene glycol having a weight average molecular weight of about 400 to about 1,000.

6. Adhesive compositions as set forth in claim 1 wherein the one or more plasticizers are a mixture of one or more plasticizers which are liquid at room temperature and one or more plasticizers which are solid at room temperature.

7. Adhesive compositions as set forth in claim 1 wherein the ethylene-vinyl acetate copolymer has a melt index of about 150 to about 400.

8. Adhesive compositions as set forth in claim 1 wherein one or more acid compounds selected from the group consisting of phosphorus acid, phosphoric acid and pyrophosphoric acid is present.

9. Adhesive compositions as set forth in claim 8 wherein an amount of the one or more acid compounds is from about 0.1 to about 3% by weight based on the polyvinyl alcohol.

10. Adhesive compositions as set forth in claim 8 wherein the one or more acid compounds is phosphorous acid.

11. Adhesive compositions as set forth in claim 8 wherein the one or more acid compounds is pyrophosphoric acid.

12. A process for producing water soluble or dispersible hot-melt type adhesive compositions comprising (a) polyvinyl alcohol having a residual acetate group content of about 30 to about 60 mol%, (b) a plasticizer in an amount of above about $(0.08\bar{p} - 10)\%$ by weight (but above 0% by weight) and below about $(0.08\bar{p} + 25)\%$ by weight based on said polyvinyl alcohol, and (c) an ethylene-vinyl acetate copolymer in an amount of 0 to about 50% by weight based on said polyvinyl alcohol, which consists essentially of the following steps:

(A) preparing polyvinyl acetate having an average degree of polymerization of about 60 to about 200 ($\bar{p}$) by polymerizing vinyl acetate in a solvent;

(B) dissolving the resultant polyvinyl acetate in absolute methanol, the amount of the absolute methanol being from about the stoichiometric amount necessary to obtain polyvinyl alcohol having a degree of hydrolysis of about 40 to about 70 mol% to about 2 times as much as the above-defined stoichiometric amount;

(C) adding an alkali to the resultant solution to carry out alkaline hydrolysis of the polyvinyl acetate; and (D) mixing the resultant polyvinyl alcohol with the plasticizer in the above described amount and the ethylene-vinyl acetate copolymer in the above described amount upon melting.

13. A process for producing adhesive compositions as set forth in claim 12 wherein the solvent used for polymerization of the vinyl acetate is one or more alcohols having a chain transfer constant above about $20 \times 10^{-4}$ at the polymerization temperature.

14. A process for producing adhesive compositions as set forth in claim 13 wherein the one or more alcohols include ethanol.

15. A process for producing adhesive compositions as set forth in claim 13 wherein the one or more alcohols include isopropanol.

16. A process for producing adhesive compositions as set forth in claim 12 wherein the plasticizer is polyethylene glycol having a weight average molecular weight of about 400 to about 1000.

17. A process for producing adhesive compositions as set forth in claim 12 wherein the one or more plasticizers are a mixture of one or more plasticizers which are liquid at room temperature and one or more plasticizers which are solid at room temperature.

18. A process for producing adhesive compositions as set forth in claim 12 wherein the ethylene-vinyl acetate copolymer has a melt index of about 150 to about 400.

19. A process for producing adhesive compositions as set forth in claim 12 wherein the polyvinyl alcohol mixed with the plasticizer and the ethylene-vinyl acetate copolymer by melting is that produced by alkaline hydrolysis of polyvinyl acetate and drying the resultant product by melting by means of a vent type extruder.

20. A process for producing adhesive compositions as set forth in claim 12 wherein the step of mixing the polyvinyl alcohol with the plasticizer and the ethylene-vinyl acetate copolymer by melting is carried out by mixing the polyvinyl alcohol still containing the methanol with the plasticizer and the ethylene-vinyl acetate copolymer by melting and removing the solvent at a temperature above the melting point of the polyvinyl alcohol.

21. A process for producing adhesive compositions as set forth in claim 20 wherein mixing by melting is carried out by means of a vent type extruder.

22. A process for producing water soluble or dispersible hot-melt type adhesive compositions comprising (a) polyvinyl alcohol having a residual acetate group content of about 30 to about 60 mol%, (b) a plasticizer in an amount of above about $(0.08 \bar{p} - 10)\%$ by weight (but above 0% by weight) and below about $(0.08 \bar{p} + 25)\%$ by weight based on said polyvinyl alcohol, (c) an ethylene-vinyl acetate copolymer in an amount of 0 to about 50% by weight based on said polyvinyl alcohol and (d) an acid compound selected from the group consisting of phosphorus acid, phosphoric acid and pyrophosphoric acid in an amount of about 0.5 to about 3% by weight, which consists essentially of the following steps:

(A) preparing polyvinyl acetate having an average degree of polymerization (p) of about 60 to about 200 by polymerizing vinyl acetate in a solvent;

(B) dissolving the resultant polyvinyl acetate in absolute methanol, the amount of the absolute methanol being from about the stoichiometric amount necessary to obtain polyvinyl alcohol having a degree of hydrolysis of about 40 to about 70 mol% to about 2 times as much as the above-defined stoichiometric amount;

(C) adding an alkali to the resultant solution to carry out alkaline hydrolysis of the polyvinyl acetate; and (D) mixing the resultant polyvinyl alcohol with the plasticizer in the above described amount, the ethylene-vinyl acetate copolymer in the above described amount and the acid compound in the amount of the above-described amount by melting.

23. A proces for producing adhesive compositions as set forth in claim 22 wherein the acid compound is phosphorous acid.

24. A process for producing adhesive compositions as set forth in claim 22 wherein the acid compound is pyrophosphoric acid.

* * * * *